(12) United States Patent
Otani et al.

(10) Patent No.: US 11,885,101 B2
(45) Date of Patent: Jan. 30, 2024

(54) REMOTE OPERATION SYSTEM AND REMOTE OPERATION SERVER

(71) Applicant: KOBELCO CONSTRUCTION MACHINERY CO., LTD., Hiroshima (JP)

(72) Inventors: Masaki Otani, Hiroshima (JP); Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 334 days.

(21) Appl. No.: 17/438,642

(22) PCT Filed: Dec. 2, 2019

(86) PCT No.: PCT/JP2019/047071
§ 371 (c)(1),
(2) Date: Sep. 13, 2021

(87) PCT Pub. No.: WO2020/194884
PCT Pub. Date: Oct. 1, 2020

(65) Prior Publication Data
US 2022/0186466 A1 Jun. 16, 2022

(30) Foreign Application Priority Data
Mar. 27, 2019 (JP) .................................. 2019-059760

(51) Int. Cl.
*E02F 9/20* (2006.01)
*E02F 9/26* (2006.01)
*G05D 1/00* (2006.01)

(52) U.S. Cl.
CPC ............ *E02F 9/205* (2013.01); *E02F 9/2054* (2013.01); *E02F 9/262* (2013.01); *G05D 1/0027* (2013.01); *G05D 1/0038* (2013.01)

(58) Field of Classification Search
CPC ......... E02F 9/205; E02F 9/2054; E02F 9/262; E02F 9/261; G05D 1/0027; G05D 1/0038; G08C 2201/42; G08C 17/02; H04Q 9/00
See application file for complete search history.

(56) References Cited

U.S. PATENT DOCUMENTS 9,715,008 B1 * 7/2017 Côté .................... G01S 13/885
9,983,406 B2 * 5/2018 Lee ........................ G02B 30/27
(Continued)

FOREIGN PATENT DOCUMENTS

JP 2006-301723 A 11/2006
JP 2016-076801 A 5/2016
JP 2018-501684 A 1/2018

OTHER PUBLICATIONS

The extended European search report dated Mar. 11, 2022 issued in the corresponding EP Patent Application No. 19921240.8.

*Primary Examiner* — Mussa A Shaawat
(74) *Attorney, Agent, or Firm* — Carrier, Shende & Assiclate P.C.; Joseph P. Carrier; Fulchand P. Shende

(57) ABSTRACT

Provided is a system which can avoid instability of an operating state of a working machine, when switching a remote operation actor of the working machine. In a case where a state of one or both of a working machine 40 or a first operator is a specified state when the working machine 40 is remotely operated through a first remote operation apparatus 10, a first notification corresponding to the specified state is transmitted to a remote operation server 30. In the remote operation server 30, a second remote operation apparatus 20 which is appropriate in view of content of the
(Continued)

first notification is selected as the remote operation actor of the working machine 40.

8 Claims, 6 Drawing Sheets

(56) References Cited

U.S. PATENT DOCUMENTS

| | | | |
|---|---|---|---|
| 10,474,228 B2* | 11/2019 | Niccolini | H04N 7/18 |
| 2016/0004305 A1* | 1/2016 | Pagliani | G06T 19/006 |
| | | | 345/633 |
| 2017/0322624 A1* | 11/2017 | Niccolini | E02F 9/0858 |
| 2018/0172990 A1* | 6/2018 | Fujita | G02B 27/01 |
| 2018/0240329 A1 | 8/2018 | Steinmetz | |
| 2019/0387219 A1* | 12/2019 | Kondo | G06T 19/00 |
| 2021/0017738 A1* | 1/2021 | Sano | E02F 9/264 |
| 2021/0087794 A1* | 3/2021 | Yamamoto | E02F 9/2296 |
| 2021/0140147 A1* | 5/2021 | Filla | E02F 9/261 |
| 2021/0246626 A1* | 8/2021 | Yamamoto | G08B 21/24 |
| 2021/0246631 A1* | 8/2021 | Kurosawa | G06V 20/58 |
| 2021/0381203 A1* | 12/2021 | Itoh | H04N 7/181 |

* cited by examiner

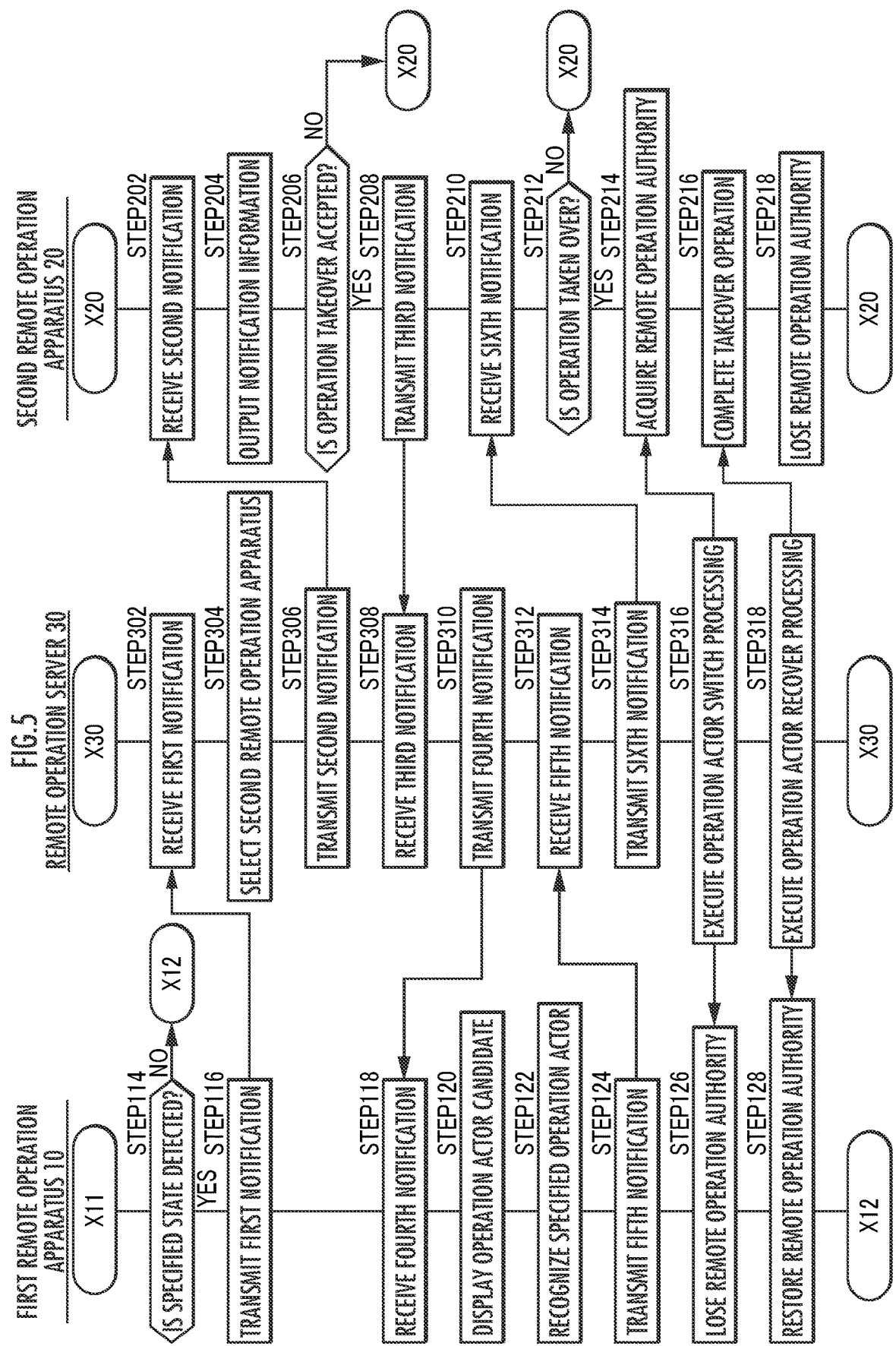

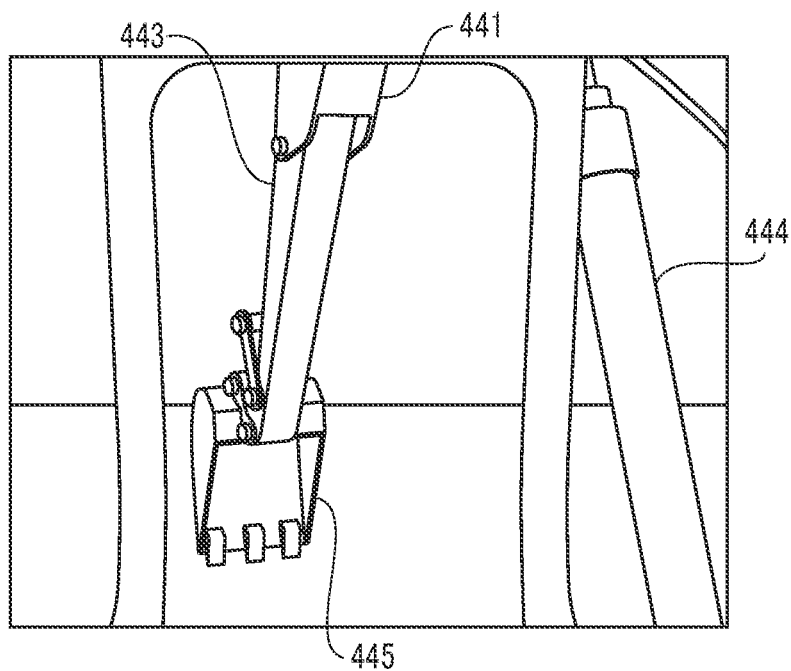

REMOTE OPERATION SYSTEM AND REMOTE OPERATION SERVER

TECHNICAL FIELD

The present invention relates to a system for performing a remote operation of a working machine or the like.

BACKGROUND ART

A technology of remotely operating a working machine is suggested (see, e.g., Patent Literature 1).

CITATION LIST

Patent Literature

Patent Literature 1: Japanese Patent Laid-Open No. 2016-076801

SUMMARY OF INVENTION

Technical Problem

However, in a case where a remote operation actor of a working machine is switched from one operator who operates one remote operation apparatus to the other operator who operates the other remote operation apparatus, in view of an operating state of the working machine corresponding to a remotely operated action by the one operator, a remotely operated action by the other operator might be inappropriate, and eventually the operating state of the working machine might be unstable.

To solve the problem, an object of the present invention is to provide a system which can avoid instability of an operating state of a working machine when switching a remote operation actor of the working machine.

Solution to Problem

The present invention provides a remote operation system comprising a working machine including an actuation mechanism and an imaging device which images environment including at least a part of the actuation mechanism, a plurality of remote operation apparatuses each including an operation mechanism configured to perform a remote operation of the working machine and an image output device which displays an environmental image captured by the imaging device of the working machine, and a remote operation server having a function of intercommunicating with each of the plurality of remote operation apparatuses.

In the remote operation system of the present invention, a first remote operation apparatus in the plurality of remote operation apparatuses comprises a state detector which detects that a state of at least one of the working machine and an operator is a specified state, and a first client control device which transmits a first notification corresponding to the specified state, in a case where the state detector detects that the state of at least one of the working machine and the operator is the specified state, and the remote operation server comprises a first server arithmetic processing element which receives the first notification, and selects a second remote operation apparatus different from the first remote operation apparatus in the plurality of remote operation apparatuses based on the first notification, and a second server arithmetic processing element which transmits a second notification in response to the first notification to the second remote operation apparatus or a second client control device of the second remote operation apparatus, and executes processing for changing remote operation authority of the working machine from the first remote operation apparatus to the second remote operation apparatus.

The present invention also provides a remote operation server having a function of intercommunicating with each of a plurality of remote operation apparatuses configured to perform a remote operation of a working machine, the remote operation server comprising a first server arithmetic processing element which receives a first notification corresponding to a specified state and transmitted from a first remote operation apparatus, in response to the first remote operation apparatus in the plurality of remote operation apparatuses which detects that a state of at least one of the working machine and an operator is a specified state, the first server arithmetic processing element selecting a second remote operation apparatus different from the first remote operation apparatus in the plurality of remote operation apparatuses based on the first notification, and a second server arithmetic processing element which transmits, to the second remote operation apparatus, a second notification in response to the first notification, and which executes processing for changing remote operation authority of the working machine from the first remote operation apparatus to the second remote operation apparatus.

BRIEF DESCRIPTION OF DRAWINGS

FIG. 5 is an explanatory view concerning a second function of the remote operation system as the embodiment of the present invention.

FIG. 6 is an explanatory view concerning an environmental image.

DESCRIPTION OF EMBODIMENTS (Configuration)

Figure 1:
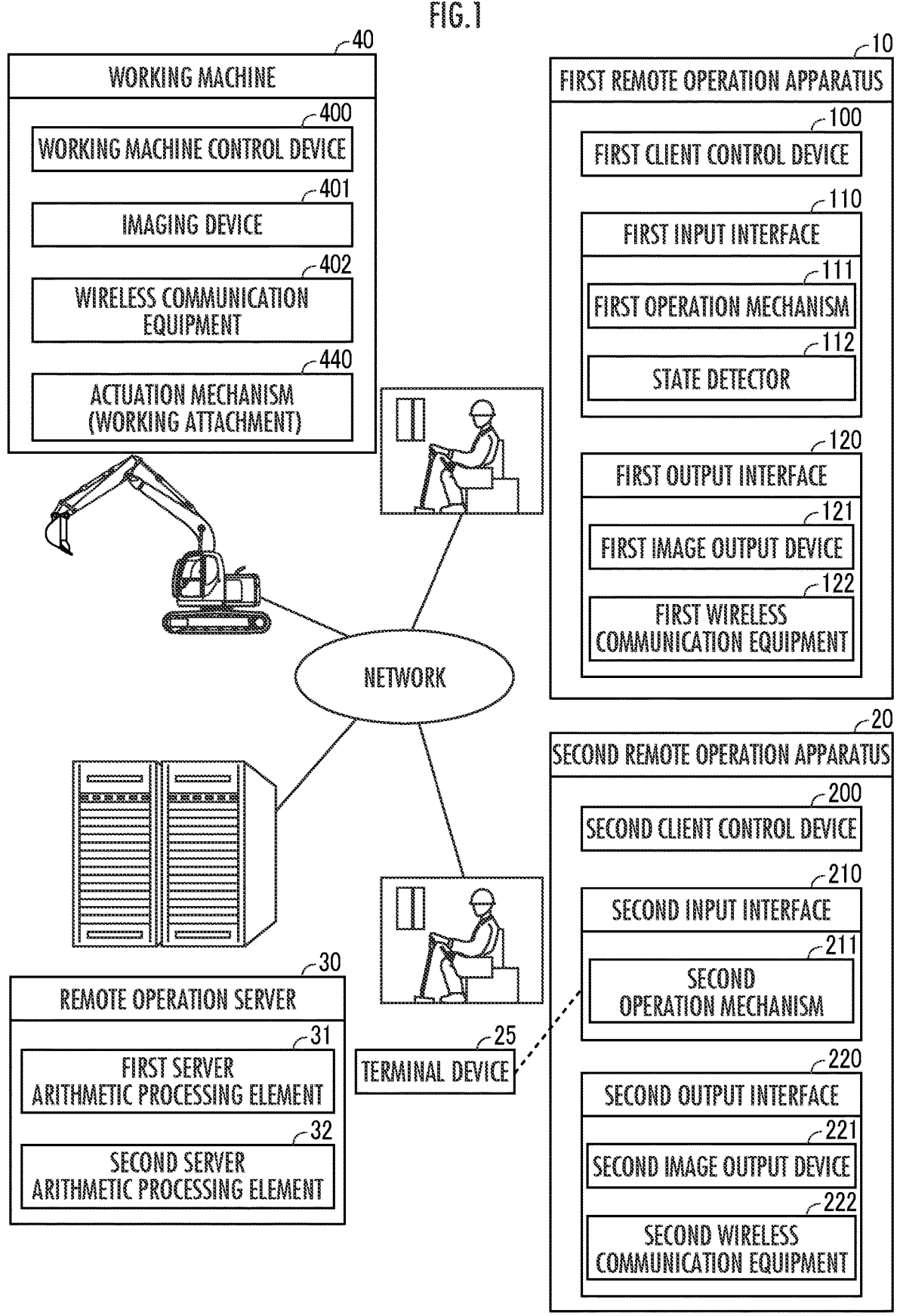
FIG. 1 is an explanatory view concerning a configuration of a remote operation system as an embodiment of the present invention.

A remote operation system as an embodiment of the present invention shown in FIG. 1 comprises a first remote operation apparatus 10, a second remote operation apparatus 20, a remote operation server 30, and a working machine 40. A remote operation actor of the common working machine 40 is switchable between first remote operation apparatus 10 and the second remote operation apparatus 20 by the remote operation server 30.

(Configuration of Working Machine)

The working machine 40 comprises a working machine control device 400, an imaging device 401, wireless communication equipment 402 and an actuation mechanism 440. The working machine control device 400 is constituted of an arithmetic processing device (a single core processor or a multicore processor or a processor core forming this processor), and reads required data and software from a storage device such as a memory, to execute arithmetic processing of the data as an object in accordance with the software.

Figure 2:
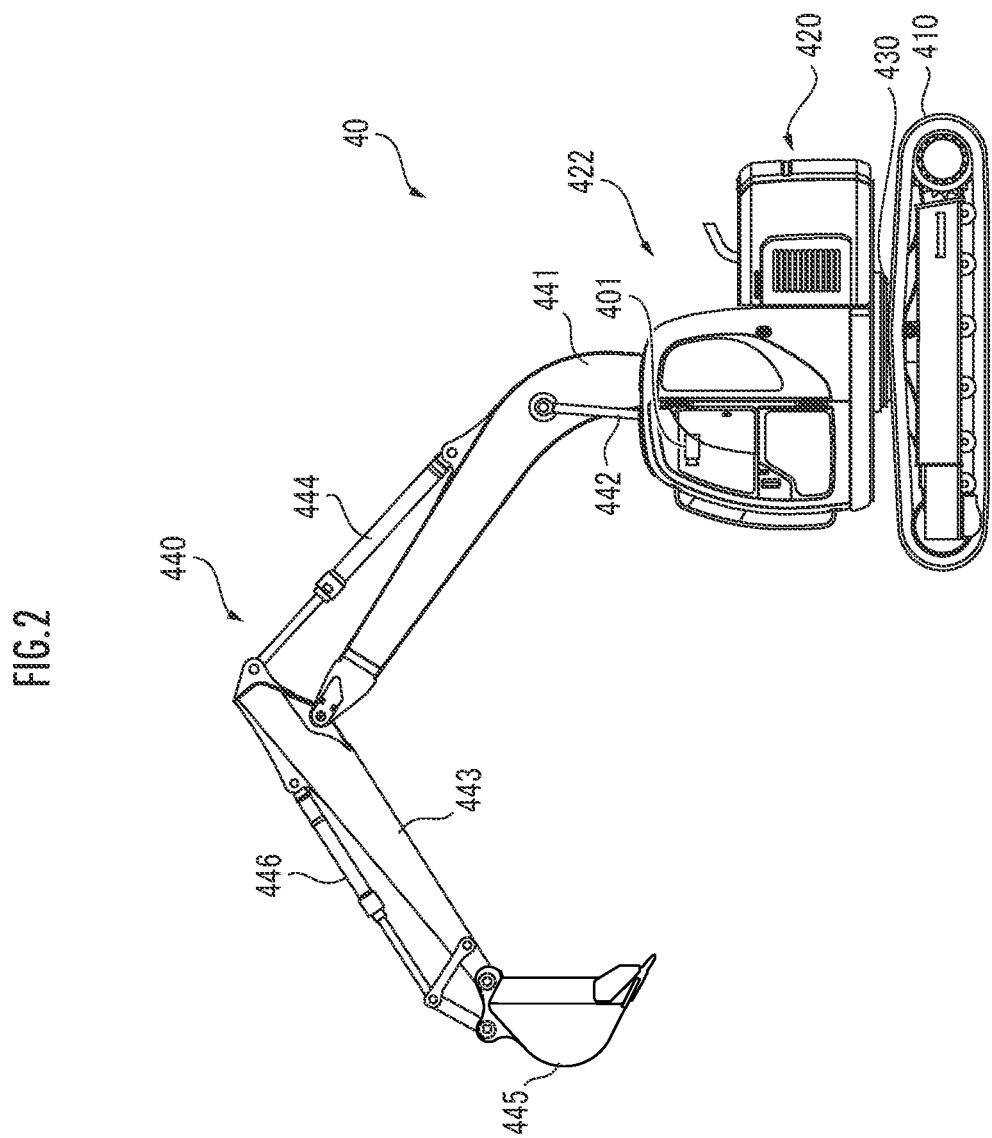
FIG. 2 is an explanatory view concerning a configuration of a working machine.

The working machine 40 is, for example, a crawler excavator (a construction machine), and comprises a crawler type of lower running body 410, and an upper rotation body 420 rotatably mounted on the lower running body 410 via a rotation mechanism 430 as shown in FIG. 2. A cab (driver's cab) 422 is disposed in a front left part of the upper rotation body 420. The working attachment 440 is disposed in a front central part of the upper rotation body 420.

The working attachment 440 as the actuation mechanism comprises a boom 441 capable of rising when mounted to the upper rotation body 420, an arm 443 rotatably coupled to a tip end of the boom 441, and a bucket 445 rotatably coupled to a tip end of the arm 443. A boom cylinder 442, an arm cylinder 444 and a bucket cylinder 446 constituted of a telescopic hydraulic cylinder are mounted to the working attachment 440.

The boom cylinder 442 is interposed between the boom 441 and the upper rotation body 420 to receive supply of hydraulic oil, thereby expand and contract and rotate the boom 441 in a rising direction. The arm cylinder 444 is interposed between the arm 443 and the boom 441 to receive supply of hydraulic oil, thereby expand and contract and rotate the arm 443 relative to the boom 441 about a horizontal axis. The bucket cylinder 446 is interposed between the bucket 445 and the arm 443 to receive supply of hydraulic oil, thereby expand and contract and rotate the bucket 445 relative to the arm 443 about the horizontal axis.

The imaging device 401 is installed, for example, in the cab 422, and environment including at least a part of the actuation mechanism 440 is imaged through a front window of the cab 422.

The cab 422 is provided with an actual machine operation lever corresponding to an operation lever (described later) forming the first remote operation apparatus 10, and a drive mechanism or a robot which receives, from a remote operation room, a signal in response to an operational action of each operation lever, and moves the actual machine operation lever based on the received signal.

(Configuration of First Remote Operation Apparatus)

The first remote operation apparatus 10 comprises a first client control device 100, a first input interface 110, and a first output interface 120. The first client control device 100 is constituted of an arithmetic processing device (a single core processor or a multicore processor or a processor core forming this processor), and reads required data and software from a storage device such as a memory, to execute arithmetic processing of the data as an object in accordance with the software. The first input interface 110 comprises a first operation mechanism 111 and a state detector 112. The first output interface 120 comprises a first image output device 121 and first wireless communication equipment 122.

A component (e.g., the component excluding the first operation mechanism 111) of at least a part of the first remote operation apparatus 10 may be a terminal 25 portable by an operator, such as a smartphone or a tablet terminal. In this case, a storage of the terminal 25 may be disposed in the first remote operation apparatus 10.

The first operation mechanism 111 includes a running operation device, a rotating operation device, a boom operation device, an arm operation device, and a bucket operation device. Each operation device includes an operation lever which receives a rotating operation. The operation lever (a running lever) of the running operation device is operated to move the lower running body 410. The running lever may serve also as a running pedal. For example, the running pedal fixed to a base or a lower end of the running lever may be disposed. An operation lever (a rotation lever) of the rotating operation device is operated to move a hydraulic rotation motor forming the rotation mechanism 430. An operation lever (a boom lever) of the boom operation device is operated to move the boom cylinder 442. An operation lever (an arm lever) of the arm operation device is operated to move the arm cylinder 444. An operation lever (a bucket lever) of the bucket operation device is operated to move the bucket cylinder 446.

Figure 3:
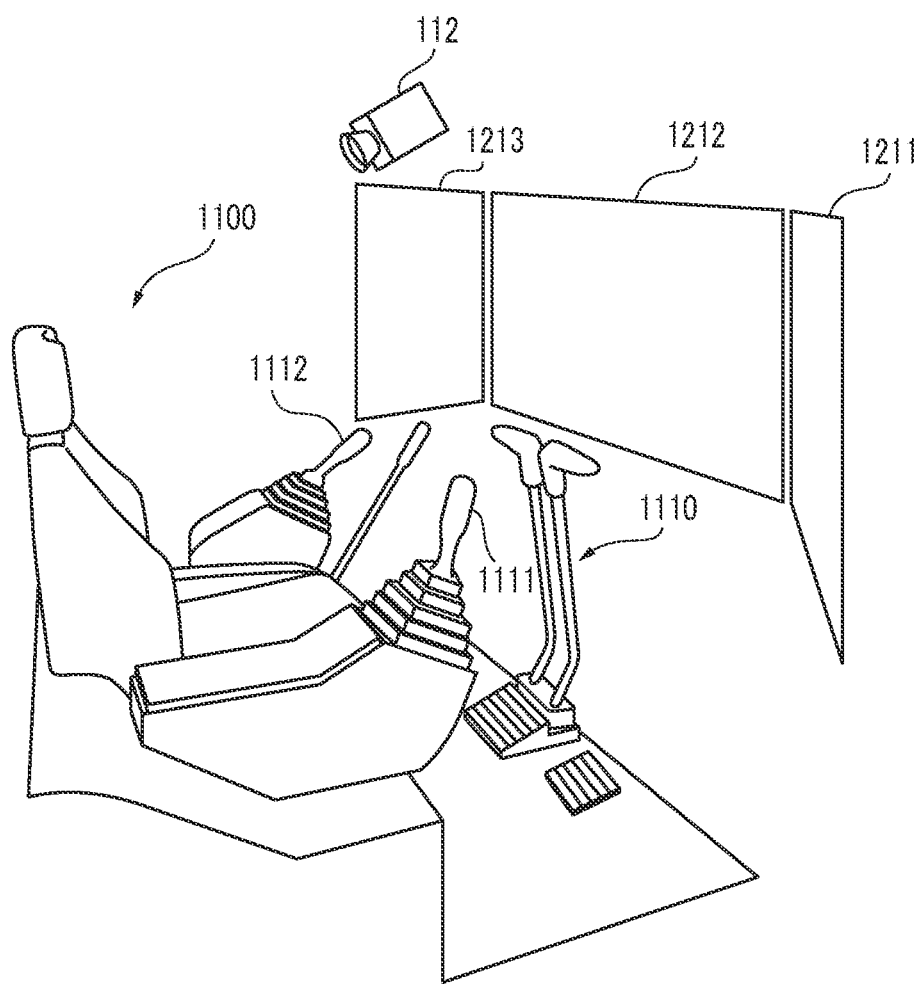
FIG. 3 is an explanatory view concerning a configuration of a first remote operation apparatus.

The respective operation levers forming the first operation mechanism 111 are arranged around a seat 1100 in which an operator is seated, for example, as shown in FIG. 3. The seat 1100 has, for example, a form of a high back chair with an arm rest, and may have an arbitrary form in which the operator can be seated, such as a form of a low back chair with no head rest, or a form of a chair with no backrest.

A pair of right and left running levers 1110 corresponding to right and left crawlers are laterally arranged side by side in front of the seat 1100. One operation lever may serve as a plurality of operation levers. For example, a right operation lever 1111 disposed in front of a right frame of the seat 1100 shown in FIG. 3 may function as the boom lever when operated in a front-rear direction and function as the bucket lever when operated in a right-left direction. Similarly, a left operation lever 1112 disposed in front of a left frame of the seat 1100 shown in FIG. 3 may function as the arm lever when operated in the front-rear direction, and function as the rotation lever when operated in the right-left direction. A lever pattern may be arbitrarily changed in response to an operator's operation instruction.

For example, as shown in FIG. 3, the first image output device 121 is constituted of a right diagonally forward image output unit 1211, a front image output unit 1212 and a left diagonally forward image output unit 1213 arranged diagonally forward right, in front and diagonally forward left relative to the seat 1100. The image output units 1211 to 1213 may further comprise a speaker (a voice output unit).

The state detector 112 detects that a state of one or both of the working machine 40 and a first operator of the first remote operation apparatus 10 is a specified state. For example, it is detected as the specified state that a help button forming the first input interface 110 is pressed. The first operator can press the help button, for example, in a case of feeling uneasy about a remote operation of the working machine 40, through an environmental image displayed in the first image output device 121 or an image representing an operating state of the working machine 40.

The help button may be a physical button which can be pushed down and is disposed in the first remote operation apparatus 10, and it may be detected that the button is pushed down. Alternatively, a virtual button may be displayed on a touch panel such as the terminal device 25 and it may be detected that a virtual button position is pushed down.

The specified state may be detected not only from the above help button but also information related to lack of skills of the first operator for the operation, reduced work efficiency due to fatigue of the first operator, poor physical condition or the like.

At least one of a state of movement of a sight line, a speaking state, a motion state of a predetermined body part such as a finger, hand, arm or shoulder, and physiological information such as brain wave, sweating amount, heart rate and blood pressure of the first operator may be detected, and it may be detected as the specified state that a psychological state or physiological state of the first operator which is estimated in accordance with a predetermined algorithm based on the detection result is a specified psychological state or a specified physiological state.

In this case, the specified state can be detected based on the motion state, for example, by detecting that an operation of the first operator deviates from a predetermined operation such as a drilling operation. Specifically, it can be detected whether a sight line direction detected with a sight line detection sensor which detects the movement of the first operators sight line deviates from a sight line direction assumed from a sight line direction assumed in a predetermined operation, or it can be detected whether the operation of the operation lever or operation pedal deviates from an operation assumed in the predetermined operation. The specified state can be detected in accordance with presence or frequency of the deviation.

The motion state may be detected from the speaking state of the first operator. For example, in a case where a speaker which sends voice of the first operator to a surrounding worker is mounted in the working machine 40, there can be detected a situation where the operator does not speak to the surrounding worker at an appropriate timing or a situation where the operator does not contact a person who requires communication such as a site supervisor at an appropriate timing, and the specified state can be detected in accordance with appropriateness of the speaking state.

The specified state can be detected also by detecting whether a value of the brain wave, sweating amount, heart rate, blood pressure or the like deviates from a normal value.

It may be detected as the specified state that the operating state of the working machine 40 which is detected by a sensor disposed in the working machine 40 and received through the first wireless communication equipment 122 is a specified operating state. For example, it may be detected as the specified state that an inclination angle or an inclination angular velocity of the lower running body 410 or the upper rotation body 420 to a horizontal plane which is detected by an inclination sensor disposed in the working machine 40 is a threshold value or more.

In this case, for example, in an operation by an operator who is not skilled in the remote operation, a frequency at which the inclination angle or inclination angular velocity is the threshold value or more tends to be high, and the specified state can be detected by detecting this state.

It may be detected as the specified state that an operating situation of the working machine 40 remotely operated by the first operator dissociates in view of a construction plan. For example, there is a state where in a time zone in which a predetermined work is performed in a certain area according to the construction plan stored and held in a storage device forming the first client control apparatus 100, the working machine 40 is performing the predetermined work in an area different from the corresponding area, or the working machine 40 in the corresponding area is performing another work (e.g., a drilling work prior to a finishing work) different from the predetermined work (e.g., the finishing work after end of drilling of a predetermined region). This state may be detected as the specified state with a position measurement device constituted of GPS or the like and the imaging device 401.

(Configuration of Second Remote Operation Apparatus)

The second remote operation apparatus 20 comprises a second client control device 200, a second input interface 210, and a second output interface 220. The second client control device 200 is constituted of an arithmetic processing device (a single core processor or a multicore processor or a processor core forming this processor), and reads required data and software from a storage device such as a memory, to execute arithmetic processing of the data as an object in accordance with the software. The second input interface 210 comprises a second operation mechanism 211. The second output interface 220 comprises a second image output device 221 and second wireless communication equipment 222.

A detailed configuration of the second remote operation apparatus 20 is substantially similar to the configuration of the first remote operation apparatus 10 except that the state detector 112 is omitted and except a function of the second client control device 200 which will be described later, and hence, description is omitted (see FIG. 3).

(Configuration of Remote Operation Server)

The remote operation server 30 comprises a first server arithmetic processing element 31 and a second server arithmetic processing element 32. The first server arithmetic processing element 31 receives a first notification, and selects the second remote operation apparatus 20 different from the first remote operation apparatus 10 in a plurality of remote operation apparatuses based on the first notification. The second server arithmetic processing element 32 transmits a second notification in response to the first notification to the second remote operation apparatus 20, and executes processing for changing remote operation authority of the working machine 40 from the first remote operation apparatus 10 to the second remote operation apparatus 20.

(Function)

Figure 4:
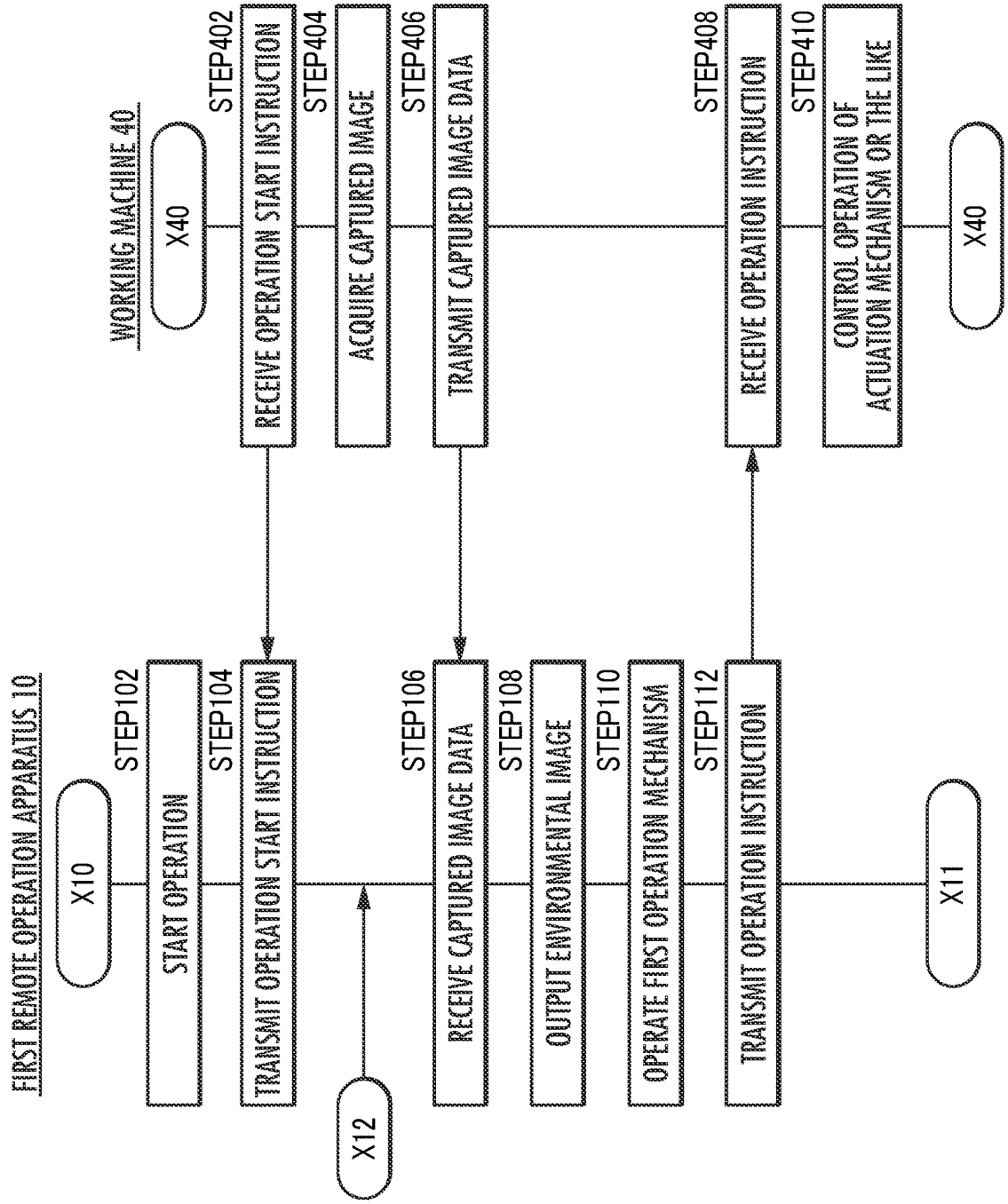
FIG. 4 is an explanatory view concerning a first function of the remote operation system as the embodiment of the present invention.

In the first remote operation apparatus 10, the first operator performs a predetermined operation (FIG. 4/STEP102). The predetermined operation is, for example, an operation of a button or an operation lever forming the first input interface 110 or the first operation mechanism 111. In response to this operation, the first client control device 100 transmits an operation start instruction from the first remote operation apparatus 10 via the remote operation server 30 to the working machine 40 through the first wireless communication equipment 122 (FIG. 4/STEP104).

In the working machine 40, the working machine control device 400 receives the operation start instruction from the remote operation server 30 through the wireless communication equipment 402 (FIG. 4/STEP402). In response to this operation, the working machine control device 400 outputs an instruction to the imaging device 401, and in response to the instruction, the imaging device 401 acquires a captured image (FIG. 4/STEP404). The working machine control device 400 transmits captured image data representing the captured image via the remote operation server 30 to the first remote operation apparatus 10 through the wireless communication equipment 402 (FIG. 4/STEP406).

In the first remote operation apparatus 10, the first client control device 100 receives the captured image data from the remote operation server 30 through the first wireless communication equipment 122 (FIG. 4/STEP106). The first client control device 100 displays an environmental image corresponding to the captured image data (all or part of the captured image itself or a simulated environmental image generated based on this image) in the first image output device 121 (FIG. 4/STEP108). Consequently, for example, as shown in FIG. 6, the environmental image including the boom 441, the arm 443, the bucket 445 and the arm cylinder 444 that are parts of the working attachment 440 as the actuation mechanism is displayed in the first image output device 121.

In the first remote operation apparatus 10, the first operator operates the first operation mechanism 111 (FIG. 4/STEP110), and in response to this operation, the first client control device 100 transmits an operation instruction corresponding to the operational action via the remote operation server 30 to the working machine 40 through the first wireless communication equipment 122 (FIG. 4/STEP112).

In the working machine 40, the working machine control device 400 receives an operation instruction from the remote operation server 30 through the wireless communication equipment 402 (FIG. 4/STEP408). In response to this instruction, the working machine control device 400 controls the operation of the working attachment 440 or the like (FIG. 4/STEP410). For example, a work of scooping soil in front of the working machine 40 with the bucket 445 and rotating the upper rotation body 420 to drop the soil from the bucket 445 is executed.

In the first remote operation apparatus 10, it is determined whether or not the specified state of the first operator and/or the working machine 40 is detected by the state detector 112 (FIG. 5/STEP114). In a case where the determination result is negative by the state detector 112 (NO in FIG. 5/STEP114), the receiving of the captured image data and the output of the environmental image as well as the operation of the first operation mechanism 111 and the transmitting of the corresponding operation instruction are repeated (see FIG. 4/STEP106, 108, 110 and 112).

On the other hand, in a case where the determination result is positive (YES in FIG. 5/STEP114), the first client control device 100 transmits the first notification corresponding to the state detection result to the remote operation server 30 through the first wireless communication equipment 122 (FIG. 5/STEP116). "The first notification" includes information required when remotely operating the working machine 40, such as the environmental image representing the environment of the working machine 40 immediately before the specified state is detected and voice information as necessary, the construction plan and the operating state and type of the working machine 40.

In the remote operation server 30, the first server arithmetic processing element 31 receives the first notification through wireless communication equipment (FIG. 5/STEP302).

The first server arithmetic processing element 31 selects the second remote operation apparatus 20 different from the first remote operation apparatus 10 in the plurality of remote operation apparatuses based on the first notification (FIG. 5/STEP304). For example, for each operator, there are registered, in database, whether or not the operator is performing the remote operation, a period until the remote operation ends in a case where the operator is performing the remote operation, the number of times of experiences of the remote operation, the number of times at which the operator takes over the remote operation from the other operator in middle, the number of times at which the other operator takes over the remote operation in the middle, the state of the working machine when taking over the remote operation, content of the remote operation (location, work content, etc. of the remotely operated working machine), and the like.

Then, for example, according to database search, when an operator is not remotely operating anther working machine and the operator has more times of experiences of the remote operation of a working machine in a state with a high degree of approximation to the specified state, the remote operation apparatus operated by the operator is preferentially selected as the second remote operation apparatus 20. Additionally, or alternatively, when an operator is not remotely operating the other working machine and the operator has more times to take over the remote operation of the working machine in the above state, the remote operation apparatus operated by the operator may be preferentially selected as the second remote operation apparatus 20. These indexes are quantified as scores when selecting a second operator, and the remote operation apparatus of one or more operators having a score of a reference value or more is selected as the second remote operation apparatus 20.

In addition to the above, skill levels of a plurality of second operators for work contents (drilling, loading, flatland leveling, flatland shaping, slope leveling and slope molding) may be registered in advance, and an operator having a high skill level of an operation required for taking over the operation may be selected as top. The second server arithmetic processing element 32 transmits the second notification in response to the first notification to the selected one or more second remote operation apparatuses 20 through the wireless communication equipment (FIG. 5/STEP306). "The second notification" may, similarly to the first notification, include the information required when remotely operating the working machine 40, such as the environmental image representing the environment of the working machine 40 immediately before the specified state is detected and the voice information as necessary, the construction plan and the operating state and type of the working machine 40, and may additionally include a message indicating that it is requested to take over the remote operation.

In the second remote operation apparatus 20, the second client control device 200 receives the second notification through the second wireless communication equipment 222 (FIG. 5/STEP202). The second client control device 200 displays second notification information corresponding to the second notification in the second image output device 221 (FIG. 5/STEP204). For example, the environmental image of the working machine 40 (see FIG. 6) and an image representing an operating situation such as the inclination angle of the upper rotation body 420 of the working machine 40 to the horizontal plane are displayed as the second notification information in the second image output device 221.

The second client control device 200 determines presence or absence of acceptance for the remote operation to be taken over by the second operator (or whether it is accepted or refused) through the operation of the second input interface 210 (FIG. 5/STEP206). In a case where the determination result is negative (NO in FIG. 5/STEP206), processing in the second client control device 200 ends. On the other hand, in a case where the determination result is positive (YES in FIG. 5/STEP206), the second client control device 200 transmits a third notification to the remote operation server 30 through the second wireless communication equipment 222 (FIG. 5/STEP208). "The third notification" includes a message indicating that the second operator accepts to take over the remote operation of the working machine 40, and additionally includes an identifier for identifying the second remote operation apparatus 20.

The second server arithmetic processing element 32 receives the third notification through the wireless communication equipment (FIG. 5/STEP306). The second server arithmetic processing element 32 transmits a fourth notification in response to the third notification to the first remote operation apparatus 10 through the wireless communication equipment (FIG. 5/STEP308). "The fourth notification" includes the second operator who accepts to take over the remote operation or the second remote operation apparatus 20, and additionally includes the location, work content and the like of a working device remotely operated by the second operator. In a case where the third notification is a notification indicative of absence of acceptance by the second operator, the second server arithmetic processing element 32 may be configured so that the remote operation authority of the working machine 40 is not changed to the second remote operation apparatus 20.

In the first remote operation apparatus 10, the first client control device 100 receives the fourth notification through the first wireless communication equipment 122 (FIG. 5/STEP118). The first client control device 100 displays fourth notification information corresponding to the fourth notification to the first image output device 121 (FIG. 5/STEP120). For example, a list of second operators (operation actor candidates) who accept the remote operation of the working machine 40 is displayed together with attributes such as contents of remote operation experiences as the fourth notification information in the second image output device 221.

The first client control device 100 recognizes, through the first input interface 110, the second operator as the operation actor candidate specified by the first operator (FIG. 5/STEP122). The first client control device 100 transmits, though the first wireless communication equipment 122, a fifth notification corresponding to the selection result to the remote operation server 30 (FIG. 5/STEP124). "The fifth notification" includes an identifier for identifying the second operator specified by the first operator.

In the remote operation server 30, the second server arithmetic processing element 32 receives the fifth notification through the wireless communication equipment (FIG. 5/STEP312).

The second server arithmetic processing element 32 transmits, through the wireless communication equipment, a sixth notification to the second remote operation apparatus 20 of the second operator specified by the first operator (FIG. 5/STEP316). "The sixth notification" includes determination result indicating whether or not to take over the operation. In the second remote operation apparatus 20, the second client control device 200 receives the sixth notification through the second wireless communication equipment 222 (FIG. 5/STEP210). In a case where the determination result included in "the sixth notification" is negative (NO in FIG. 5/STEP212), the processing in the second client control device 200 ends. In a case where the determination result included in the "the sixth notification" is positive, transmission of an operation instruction from the second remote operation apparatus 20 to the working machine 40 is permitted. The second remote operation apparatus 20 as a new first remote operation apparatus 10 is allowed to perform the remote operation of the working machine 40 (see FIG. 4). That is, the second client control device 200 acquires the remote operation authority of the working machine 40 from the first remote operation apparatus 10, in a case where the sixth notification is a notification indicating that the remote operation authority is changed.

In response to this operation, the second server arithmetic processing element 32 executes processing for changing the remote operation authority of the working machine 40 from the first remote operation apparatus 10 to the second remote operation apparatus 20 (FIG. 5/STEP316). For example, the transmission of the operation instruction by the first remote operation apparatus 10 to the working machine 40 is prohibited (FIG. 5/STEP126). The first remote operation apparatus 10 is ready to allow the second remote operation apparatus 20 to newly take over the remote operation of the working machine. The second remote operation apparatus 20 then acquires the operation authority of the working machine 40 (FIG. 5/STEP214).

When an operation of taking over the working machine 40 by the second remote operation apparatus 20 is completed (FIG. 5/STEP216), processing to recover the remote operation authority of the working machine 40 is executed (FIG. 5/STEP318). For example, the transmission of the operation instruction from the first remote operation apparatus 10 to the working machine 40 is restored (FIG. 5/STEP128). The transmission of the operation instruction by the second remote operation apparatus 20 to the working machine 40 is then prohibited (FIG. 5/STEP218).

(Effects)

According to the remote operation system of the configuration, in a case where the state of one or both of the working machine 40 or the first operator is the specified state when the working machine 40 is remotely operated through the first remote operation apparatus 10, the second remote operation apparatus 20 may be selected as the remote operation actor of the working machine 40 in view of the first notification corresponding to the specified state (see FIG. 5). Therefore, instability of the operating state of the working machine 40 can be avoided, when switching the remote operation actor of the working machine 40.

Furthermore, the notification information corresponding to the second notification is displayed in the image output device 221 forming the second remote operation apparatus 20, and hence, information required for switching the remote operation actor of the working machine 40 can be supplied to the operator of the second remote operation apparatus 20 (see FIG. 5/STEP204).

Another Embodiment of Present Invention

In the above embodiment, the remote operation actor of the working machine 40 is switched based on requirement that it is accepted to take over the remote operation of the working machine 40 by each of the first operator and the second operator (see FIG. 5/STEP206, STEP122 and STEP314), and as another embodiment, the remote operation actor of the working machine 40 may be switched without the acceptance by one or both of the first operator and the second operator.

In accompaniment to the second remote operation apparatus 20, a terminal (PC, smartphone, tablet, or the like) having functions of the second input interface 210 and the second output interface 220 may be disposed in cooperation with the second remote operation apparatus 20 outside the second remote operation apparatus 20, and the terminal may be provided with functions of transmitting and receiving information of the second notification, the third notification, the sixth notification or the like, and the functions of the second input interface 210 and second output interface.

In this case, for example, even in a place remote from a place where the second remote operation apparatus 20 is installed, the second operator can receive the information from the remote operation server 30 to perform the operation of taking over the operation. Specifically, the second notification and sixth notification transmitted from the remote operation server 30 can be received by mail, SNS or the like, and the second operator can confirm, from the notification information, the information required for the remote operation of the working machine 40 to determine acceptance for the operation of taking over the operation, and can notify the remote operation server 30 of presence or absence of the acceptance. Also, processing until the sixth notification (information on whether or not to take over the operation) is obtained can be performed in the place remote from the second remote operation apparatus 20. After determining and confirming to take over the operation, the operator can go to the second remote operation apparatus 20.

"The second notification" of the above embodiment is configured to include the information required for the remote operation of the working machine 40 immediately before the specified state is detected, and "the second notification" may include, as the information, only information indicating that the specified state is detected or only minimum information. The information required for the remote operation of the working machine 40 immediately before the specified state is detected may be separately transmitted to the second remote operation apparatus 20.

In this case, for example, the second operator who operates the second remote operation apparatus 20 is only notified that there is the first remote operation apparatus 10 which detects the specified state. Subsequently, when determining whether or not to take over the operation, the second operator is configured to acquire, from the remote server 30, the information required for the remote operation of the working machine 40 immediately before the specified state is detected. According to this configuration, more detailed information can be supplied to the second operator who can afford to perform the operation of taking over.

In the above embodiment, in a case where there are not many candidates for the second operator, the candidates may be reduced in accordance with the score of the reference value or more, and the first operator may directly talk to the second operator by mail, chat, telephone or the like to select the second operator who performs the operation of taking over. In such a case, the fourth notification including list information of the second operators (the operation actor candidates) who accept the remote operation of the working machine 40 may be transmitted to the respective second operators who accept the remote operation of the working machine 40.

The first server arithmetic processing element 31 may select the candidate for the second remote operation apparatus 20 as a candidate for change of the remote operation authority of the working machine 40 from the first remote operation apparatus 10 based on the third notification transmitted from a plurality of second remote operation apparatuses 20. According to the remote operation system of the configuration, one second remote operation apparatus 20 as the candidate for the change of the remote operation authority of the working machine 40 may be selected based on a plurality of third notifications transmitted from the respective second remote operation apparatuses 20.

REFERENCE SIGNS LIST

10 first remote operation apparatus
20 second remote operation apparatus
25 terminal device
30 remote operation server
31 first server arithmetic processing element
32 second server arithmetic processing element
40 working machine
100 first client control device
110 first input interface
111 first operation mechanism
112 state detector
120 first output interface
121 first image output device
122 first wireless communication equipment
200 second client control device
210 second input interface
211 second operation mechanism
220 second output interface
221 second image output device
222 second wireless communication equipment
401 imaging device
402 wireless communication equipment
440 working attachment (an actuation mechanism)

The invention claimed is:

1. A remote operation system comprising:
a working machine including an actuation mechanism;
a plurality of remote operation apparatuses each including an operation mechanism configured to perform a remote operation of the working machine; and
a remote operation server having a function of intercommunicating with each of the plurality of remote operation apparatuses, wherein a first remote operation apparatus in the plurality of remote operation apparatuses comprises:
a state detector which detects that a state of at least one of the working machine and an operator is a specified state; and
a first client control device which transmits a first notification corresponding to the specified state, in a case where the state detector detects that the state of at least one of the working machine and the operator is the specified state, and
the remote operation server comprises:
a first server arithmetic processing element which receives the first notification, and selects a second remote operation apparatus different from the first remote operation apparatus in the plurality of remote operation apparatuses based on the first notification; and
a second server arithmetic processing element which transmits a second notification in response to the first notification to the second remote operation apparatus or a second client control device of the second remote operation apparatus, and which executes processing for changing remote operation authority of the working machine from the first remote operation apparatus to the second remote operation apparatus.

2. The remote operation system according to claim 1, wherein the working machine includes an imaging device which images environment including at least a part of the actuation mechanism,
each of the plurality of remote operation apparatuses includes an image output device which displays an environmental image captured by the imaging device and representing environment of the working machine, and
the second client control device receives the second notification, and outputs notification information corresponding to the second notification to the image output device.

3. The remote operation system according to claim 1 or 2, wherein the image output device is a component of a terminal device having a function of cooperating with the second remote operation apparatus.

4. The remote operation system according to claim 1, wherein in response to the receiving of the second notification, the second client control device transmits a notification indicative of presence or absence of acceptance for changing the remote operation authority of the working machine from the first remote operation apparatus to the second remote operation apparatus as a third notification to the remote operation server, and
the second server arithmetic processing element does not change the remote operation authority of the working machine to the second remote operation apparatus, in a case where the third notification is a notification indicative of absence of acceptance.

5. The remote operation system according to claim 4, wherein the third notification is transmittable by a terminal device having a function of cooperating with the second remote operation apparatus.

6. The remote operation system according to claim 4, wherein the first server arithmetic processing element selects a candidate for the second remote operation apparatus as a candidate for change of remote operation authority of the working machine from the first remote operation apparatus based on the third notification transmitted from a plurality of the second remote operation apparatuses.

7. The remote operation system according to claim 6, wherein the first server arithmetic processing element selects one second remote operation apparatus from candidates, the second server arithmetic processing element transmits a notification indicating whether or not the remote operation authority is changed as a sixth notification from the remote operation server to each of the plurality of the second remote operation apparatuses, and the second client control device acquires the remote operation authority of the working machine from the first remote operation apparatus, in a case where the sixth notification is a notification indicating that the remote operation authority is changed.

8. A remote operation server having a function of intercommunicating with each of a plurality of remote operation apparatuses configured to perform a remote operation of a working machine, the remote operation server comprising:

a first server arithmetic processing element which receives a first notification corresponding to a specified state and transmitted from a first remote operation apparatus, in response to the first remote operation apparatus in the plurality of remote operation apparatuses which detects that a state of at least one of the working machine and an operator is a specified state, the first server arithmetic processing element selecting a second remote operation apparatus different from the first remote operation apparatus in the plurality of remote operation apparatuses based on the first notification; and a second server arithmetic processing element which transmits, to the second remote operation apparatus, a second notification in response to the first notification, and which executes processing for changing remote operation authority of the working machine from the first remote operation apparatus to the second remote operation apparatus.

* * * * *